United States Patent [19]

Okada

[11] Patent Number: 5,469,567
[45] Date of Patent: Nov. 21, 1995

[54] SYSTEM FOR SECONDARY DATABASE DATA BLOCK BUFFERING WITH BLOCK SAVE GENERATIONS AND READ/WRITE ACCESS AND WITH SEPARATE MANAGEMENT

[75] Inventor: Hidemi Okada, Tokyo, Japan

[73] Assignee: NEC Corporation, Tokyo, Japan

[21] Appl. No.: 852,062

[22] Filed: Mar. 16, 1992

[30] Foreign Application Priority Data

Mar. 14, 1991 [JP] Japan .................................. 3-074551

[51] Int. Cl.$^6$ .................................................. G06F 17/30
[52] U.S. Cl. .................... 395/600; 395/494; 364/DIG. 1; 364/282.1; 364/281.3; 364/284.1; 364/284.2
[58] Field of Search ................................... 395/600, 575, 395/650, 425, 200

[56] References Cited

U.S. PATENT DOCUMENTS

| | | |
|---|---|---|
| 4,507,751 | 3/1985 | Gawlick et al. ..................... 395/575 |
| 5,043,876 | 9/1991 | Terry .................................. 395/600 |
| 5,133,066 | 7/1992 | Hansen et al. .................... 396/600 |
| 5,185,887 | 2/1993 | Takahashi et al. ................ 395/600 |
| 5,247,672 | 9/1993 | Mohan ............................... 395/650 |
| 5,276,835 | 1/1994 | Mohan et al. .................... 395/425 |
| 5,359,713 | 10/1994 | Moran et al. .................... 395/200 |

*Primary Examiner*—Thomas G. Black
*Assistant Examiner*—Wayne Amsbury
*Attorney, Agent, or Firm*—Foley & Lardner

[57] ABSTRACT

The present invention is an improved database system for reducing the wait time for database processing programs. This data system provides for the input/output of blocks of data in excess of the capacity of the buffer pool assigned to the database processing program. When a database processing program tries to refer to the same block as one already under update processing by another database processing program or tries to update the same block as one already under update processing by another data processing program, the system allows a reference or update without placing the database processing system in the waiting state.

7 Claims, 6 Drawing Sheets

SYSTEM FOR SECONDARY DATABASE DATA BLOCK BUFFERING WITH BLOCK SAVE GENERATIONS AND READ/WRITE ACCESS AND WITH SEPARATE MANAGEMENT

BACKGROUND OF THE INVENTION

1. Field of the Invention

This invention relates to a database system, and particularly relates to a database system characterized by its exclusive control method.

2. Description of the Prior Art

A conventional database system is described first. When a database processing program of a database requests input or output to a certain block in the database for the purpose of reference or update, a block exclusive control device in the system judges whether the requested block is already in use or not. If the block is in use, the block exclusive control device judges the mode and decides whether to accept the request or to have it wait, depending on the mode.

If the requested block is not in use, the request from the database processing program is accepted, a database input/output device reads the applicable block from the database and stores it in the buffer assigned to that database processing program. In case the applicable block already exists on the buffer, however, the block is not read from the database. Then, the database processing program refers to or updates the data in the block on the buffer via a database processing device.

If the database processing program requires more capacity than the buffer has for reference to or update of blocks from the database, some of the blocks are selected from the buffer for a certain reason (low access frequency, for example) and emptied so that they can be used again. In this case, already updated blocks are rewritten to the database.

On the other hand, before a database processing program requests establishment of a processing request execution point, another database processing program may send an input request for reference or input/output request for update to the same block on the database. Such a request is accepted if both database processing programs are in a reference exclusive mode. However, if either of them is in an update exclusive mode, the latter database processing program is placed in the wait state. The same thing happens even for the mode allowing reference during update processing or update during reference processing.

Since a database processing program refers to or updates a block from the database on a buffer, another database processing program may read the same block from the database at the same time for update or reference. The latter program can only refer to or update the contents as of the time it reads the block, but this causes no problem if either of the programs reads the block just for reference. However, overflow at the buffer may involve rereading of or rewriting to the same block in the database, which can cause the block to have contents different from the one read before, resulting in contradiction. To prevent such an event, it is necessary to reject the request which comes later if it is in update mode and put the program in wait state. Thus, the database processing program enters the wait stats when its request is not accepted, and the request is accepted when the preceding database processing program terminates the use of the applicable block with establishment of a processing request execution point. Processing after that is the same as described above.

Both database processing programs request establishment of a processing request execution point when their processing comes to an end, with rewriting the updated blocks on the buffer to the database and releasing the applicable block. In the event of deadlock, contents of the block to be stored on the buffer are discarded and the database is returned to the state as of the previous processing request execution point.

As described above, with a conventional database system, a database processing program trying to refer to the block already in use for update by another database processing program or trying to update the same block as the one already referred to by another database processing program is placed in the wait state until the establishment of a processing request execution point by the preceding database processing program. This impedes improvement of database processing efficiency.

SUMMARY OF THE INVENTION

The object of the present invention is to provide a database system which can reduce occurrence of wait state for database processing programs, to improve processing efficiency.

A database system according to a preferred embodiment of this invention to attain the stated object includes: a database having a storage area divided into a plurality of blocks where data are stored. A buffer means reads and stores a block in the database upon a processing request from a database processing program for reference to or to update the block by the database processing program. Exclusive control means accepts or exclude a processing request according to the mode (reference or update) of the database processing program. Extended storage means located between the database and the buffer means temporarily save blocks to be stored from the database to the buffer means or from the buffer means to the database, and to keep the same block for a plurality of generations. And a save control means provided with management means to manages the blocks saved by the extended storage at different timings as different generations. Means are provided to transfer blocks between the buffer means and the extended storage means according to the block generation.

According to a preferred embodiment, the save control means is provided with program exclusive mode control means to register the mode (reference or update) of the block saved in the extended storage as the program exclusive mode so that the exclusive control means uses the program exclusive mode for exclusive control. The save control means is also provided with a processing request execution point control means to keep the block saved in the extended storage means with its generation until establishment of a processing request execution point and, upon request for processing request execution point establishment from the database processing program, refers to the processing request execution point control means and establishes a processing request execution point.

According to another preferred embodiment, the save control means is provided with transfer means to transfer blocks from the extended storage means to the buffer means and backward transfer means to transfer blocks from the buffer means to the extended storage means.

According to a further preferred embodiment, the management means of the save control means manages blocks, treating the block saved from the database to the extended storage means as the first generation. The block is secured in the extended storage means to save the block from the buffer means as the next generation, and the block is transferred from the buffer means to the next generation block as the newest generation. The exclusive control means unconditionally accepts any processing request from the database processing program in the reference mode, but performs exclusive control for the database processing program in update mode. It accepts a processing request if the requested block is not in use. If the requested block is in use, it accepts a processing request when the mode is "reference", and places the program in wait state when the mode is "update".

A database system according to another preferred embodiment of this invention includes a database having a storage area divided into a plurality of blocks where data are stored, a buffer means which reads and stores a block in the database upon a processing request from a database processing program for reference to or update of the block by the database processing program. Exclusive control means unconditionally accept any processing request from the database processing program in the reference mode, but performs exclusive control for the database processing program in the update mode by accepting a processing request if the requested block is not in use, accepting a processing request only when the mode is "reference" and placing the program in wait state when the mode is "update" if the requested block is in use. Extended storage means located between the database and the buffer means temporarily save blocks to be stored from the database to the buffer means or from the buffer means to the database and to keep the same block for a plurality of generations. A save control means is provided with management means to manage blocks treating the block saved from the database to the extended storage means as the first generation, the block secured in the extended storage means to save the block from the buffer means as the next generation, and the block transferred from the buffer means to the next generation block as the newest generation. A transfer means transfers blocks between the buffer means and extended storage means according to the block generation. A program exclusive mode control means registers a reference or update program exclusive mode for the block saved in the extended storage for use in exclusive control by the exclusive control means. A processing request execution point control keeps the block saved in the extended storage means with its generation until the establishment of a processing request execution point.

Other objects and effects of the present invention will be clarified by the detailed description below.

DESCRIPTION OF THE PREFERRED EMBODIMENT

Figure 1:
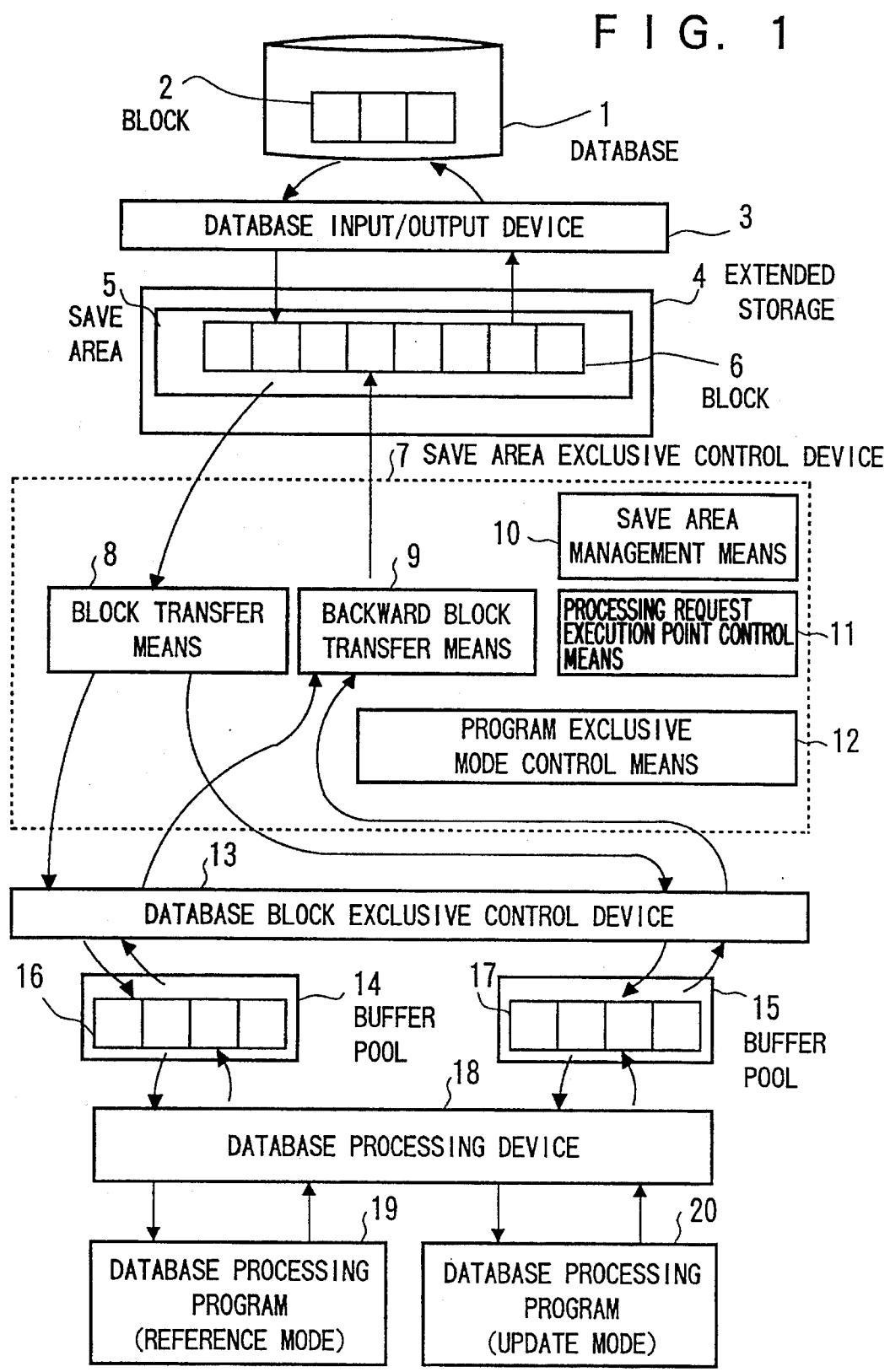
FIG. 1 is a block diagram to show the configuration of an entire database system according to an embodiment of the present invention.

Referring to FIGS. 1 to 6, a preferred embodiment of the present invention is described below. FIG. 1 is a block diagram to show the configuration of an entire database system according to an embodiment of this invention.

In FIG. 1, a database system comprises a database 1 having a storage area divided into a plurality of blocks 2 where data are stored, a database input/output device 3 to read from or write to block 2 in the database 1, an extended storage 4 provided with a save area 5 having an enough capacity to keep the same block for a plurality of generations, a save area exclusive control device 7 provided with a block transfer means 8, a backward block transfer means 9, a save area management means 10, a quiet point control means 11 and a program exclusive mode control means 12, a database block exclusive control device 13, buffer pools 14 and 15 to store blocks 2 from the database 1, a database processing device 18 and database processing programs 19 and 20. The arrows connecting devices and modules show the flow of data. In this system, the block 2 from the database 1 can be input and output for a capacity in excess of that of the buffer pool 14 or 15 assigned to the database processing program 19 or 20.

For the database 1, the database input/output device 3 inputs and outputs data treating a block 2 as a unit. Similarly, the database input/output device 3 inputs and outputs blocks for the extended storage 4. The extended storage 4 uses a nonvolatile memory.

The block transfer means 8 and the backward block transfer means 9 transfer blocks from the save area 5 to the buffer pools 14 and 15 and from the buffer pools 14 and 15 to the save area 5. The save area management means 10 serves for generation management of the blocks input to the save area 5. The processing request execution point control means 11 registers the data required to keep the block from the save area 5 with its generation up to a processing request execution point. The program exclusive mode control means 12 registers the program exclusive mode for the block input to the save area 5.

The database processing program 19 or 20 refers to or updates a block with accessing to the buffer pool 14 or 15 assigned to that program via the database processing device 18.

Now the operation of a database system having the configuration as described above is explained below. The operation for block input/output processing is described first.

When input or output of a block 2 in the database 1 is requested by the database processing program 19 or 20 for reference or update, the database block exclusive control device 13 unconditionally accepts the request if the database processing program 19 or 20 is in reference mode. If the database processing program 19 or 20 is in update mode, the database block exclusive control device 13 performs exclusive control and accepts the request when the requested block 2 is not in use. If the requested block 2 is already in use, the request is accepted when the database processing program using the block is in reference mode. When it is in update mode, the requesting database processing program 19 or 20 is placed in the wait state.

Now referring to flowcharts of FIGS. 2 to 4, the operation after acceptance of processing request from the database processing program 19 or 20 is described below.

The database processing device 18 judges the input/output mode of the database processing program 19 or 20 first (Step 201). If the input/output mode is set to "input", then it judges whether the program processing mode of the database processing program 19 or 20 is "reference" or "update" (Step 202). When the input/output mode is "input" and the program processing mode is "reference", then the database processing device 18 judges whether the requested block 2 in the database 1 exists in the buffer pool 14 or 15 assigned to the applicable database processing program 19 or 20 (Step 203).

If the block 2 exists in the buffer pool 14 or 15 in Step 203, then the procedure terminates without any processing, and the system has the database processing program 19 or 20 refer to the block 2 in the buffer pool 14 or 15 via the database processing device 18. If the block 2 does not exist in the buffer pool 14 or 15, the save area management means 10 judges whether the block 20 exists in the save area 5 of the extended storage 4 (Step 204). Note that the generation shall be also checked in judging whether two blocks are the same or not for re-input after overflow.

When the block 2 does not exist in the save area 5 in Step 204, input of the block 2 from the database 1 is requested to the database input/output device 3 and the block 2 is read to the save area 5 as a block 6. The save area management means 10 manages the block 6 (having the same contents as the block 2) input to the save area 5 as the first generation (Step 205).

When the block 2 exists in the save area 5 in Step 204 and after the block 2 is read from the database 1 to the save area 5 in the processing of Step 205, the program exclusive mode control means 12 registers "reference" as the program exclusive mode (Step 206). The program exclusion mode can be set to either of "reference" or "update" and is used in exclusive control by the database block exclusive control device 13. Next, the processing request execution point control means 11 registers the data required to keep the block 6 with its generation until the applicable processing request execution point. The data required here include the data to identify the block, the generation data and the data to tell whether the block has been updated or not.

Finally, the block transfer means 8 transfers the block 6 from the save area 5 to the buffer pool 14 or 15 (Step 208) to terminate the procedure. Now, the system has the database processing program 19 or 20 refer to the buffer 16 or 17 in the buffer pool 14 or 15 via the database processing device 18. If the save area 5 has a plurality of generations of the same block, the block of the same generation is transferred for re-input after overflow and the one of the newest generation for input after establishment of a processing request execution point.

Figure 3:
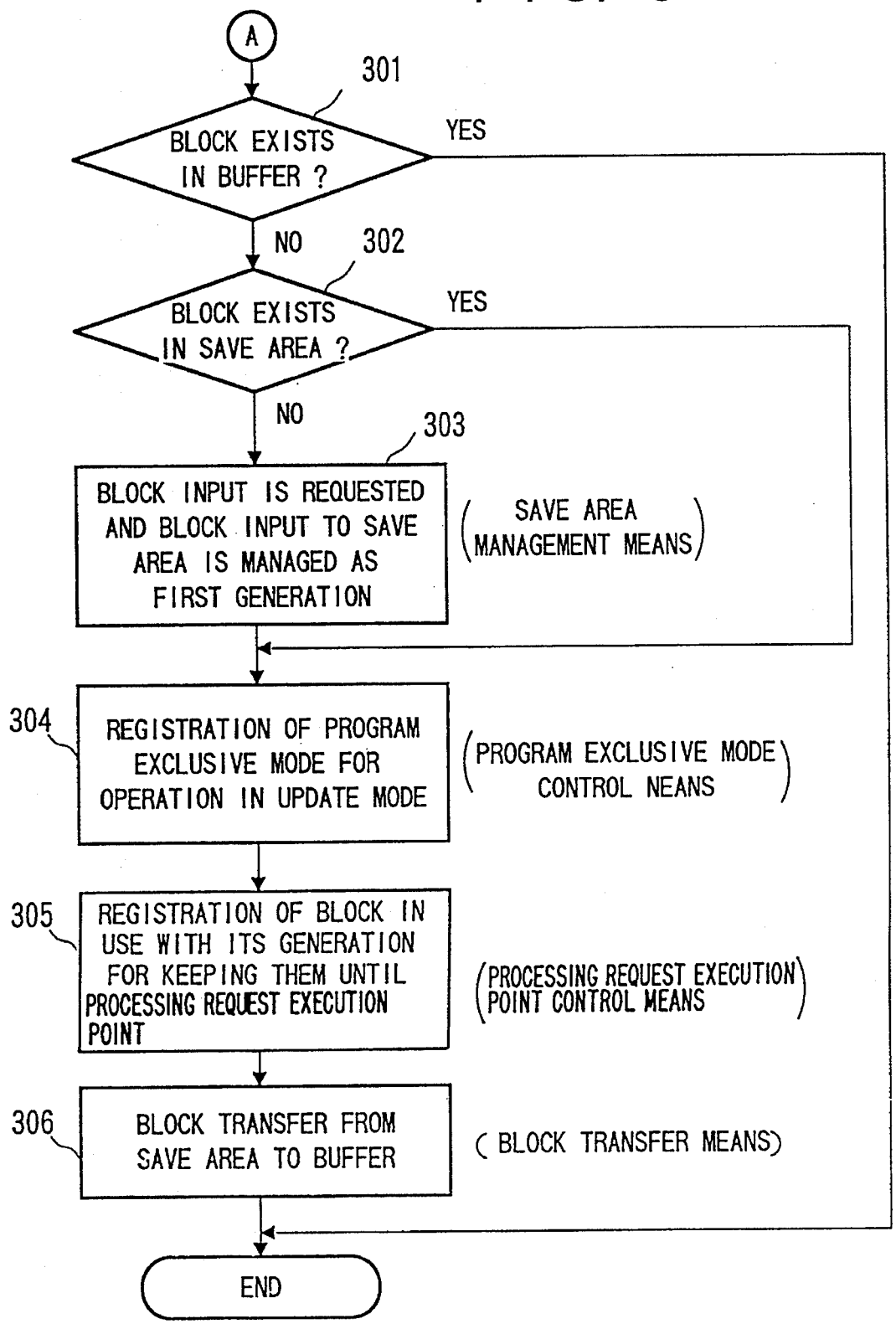
FIG. 3 is a flowchart to show continued input/output processing for blocks.

If the database processing program 19 or 20 has the input/output mode set to "input" (in Step 201) and the program processing mode set to "update" (in Step 202), the system follows the procedure as shown in FIG. 3. In FIG. 3, the database processing device 18 judges whether the requested block 2 in the database 1 exists in the buffer pool 14 or 15 assigned to the applicable database processing program 19 or 20 (Step 301).

If the block 2 exists in the buffer pool 14 or 15 in Step 301, then the procedure terminates without any processing, and the system has the database processing program 19 or 20 refer to the buffer 16 or 17 in the buffer pool 14 or 15 via the database processing device 18. If the block 2 does not exist in the buffer pool 14 or 15, the save area management means 10 judges whether the block 2 exists in the save area 5 of the extended storage 4 (Step 302).

When the block 2 does not exist in the save area 5 in Step 302, input of the block 2 from the database 1 is requested to the database input/output device 3 and the block 2 is read to the save area 5 as a block 6. The save area management means 10 manages the block 6 input to the save area 5 as the first generation (Step 303). When the block 2 exists in the save area 5 and after the block 2 is read from the database 1 to the save area 5, the program exclusive mode control means 12 registers "update" as the program exclusive mode (Step 304). Next, the processing request execution point control means 11 registers the data required to keep the block 6 with its generation until the applicable processing request execution point (Step 305). Finally, the block transfer means 8 transfers the block 6 from the save area 5 to the buffer pool 14 or 15 (Step 306) to terminate the procedure. Now the system has the database processing program 19 or 20 refer to the buffer pool 14 or 15.

Figure 2:
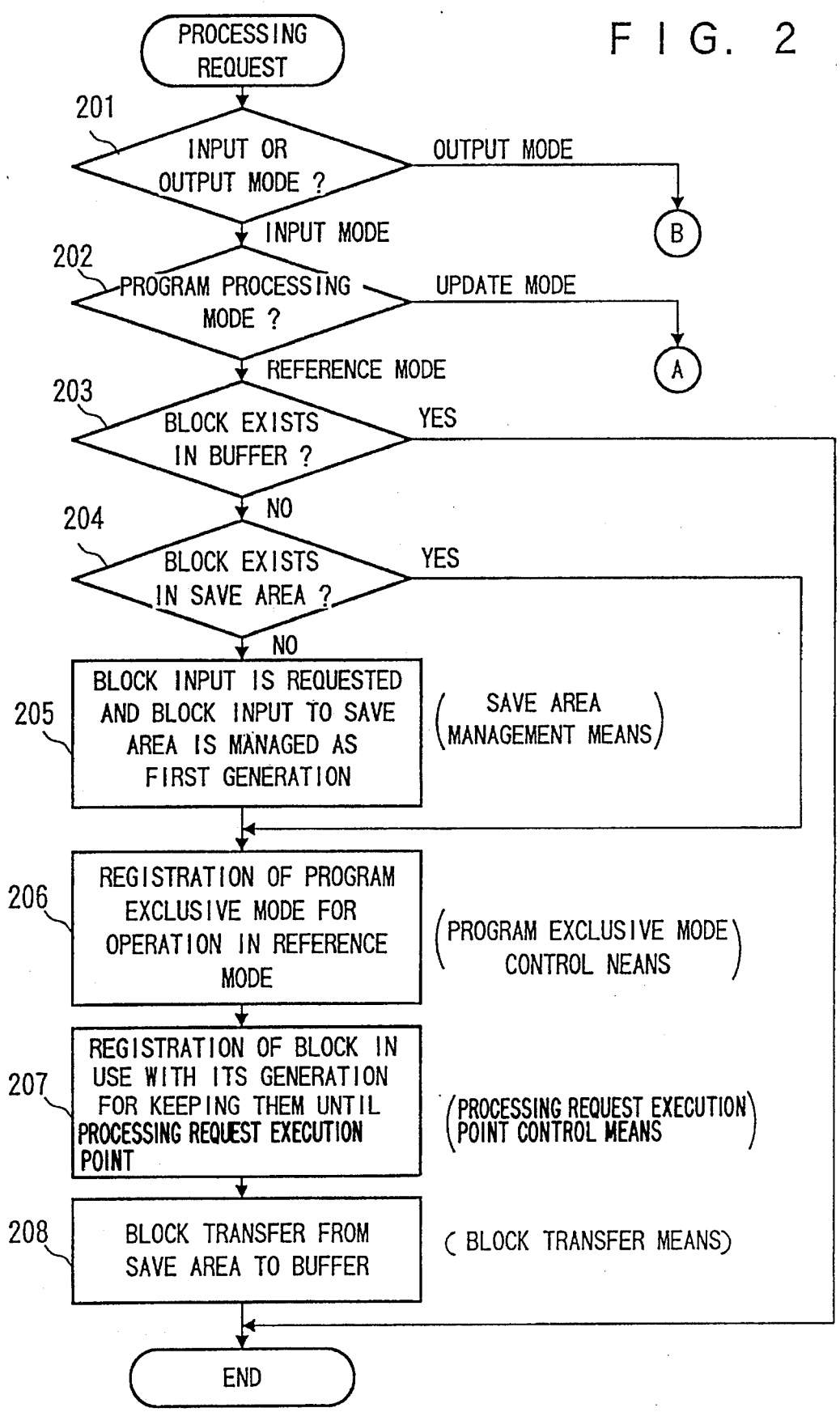
FIG. 2 is a flowchart to show input/output processing for blocks in a database system according to this embodiment.
Figure 4:
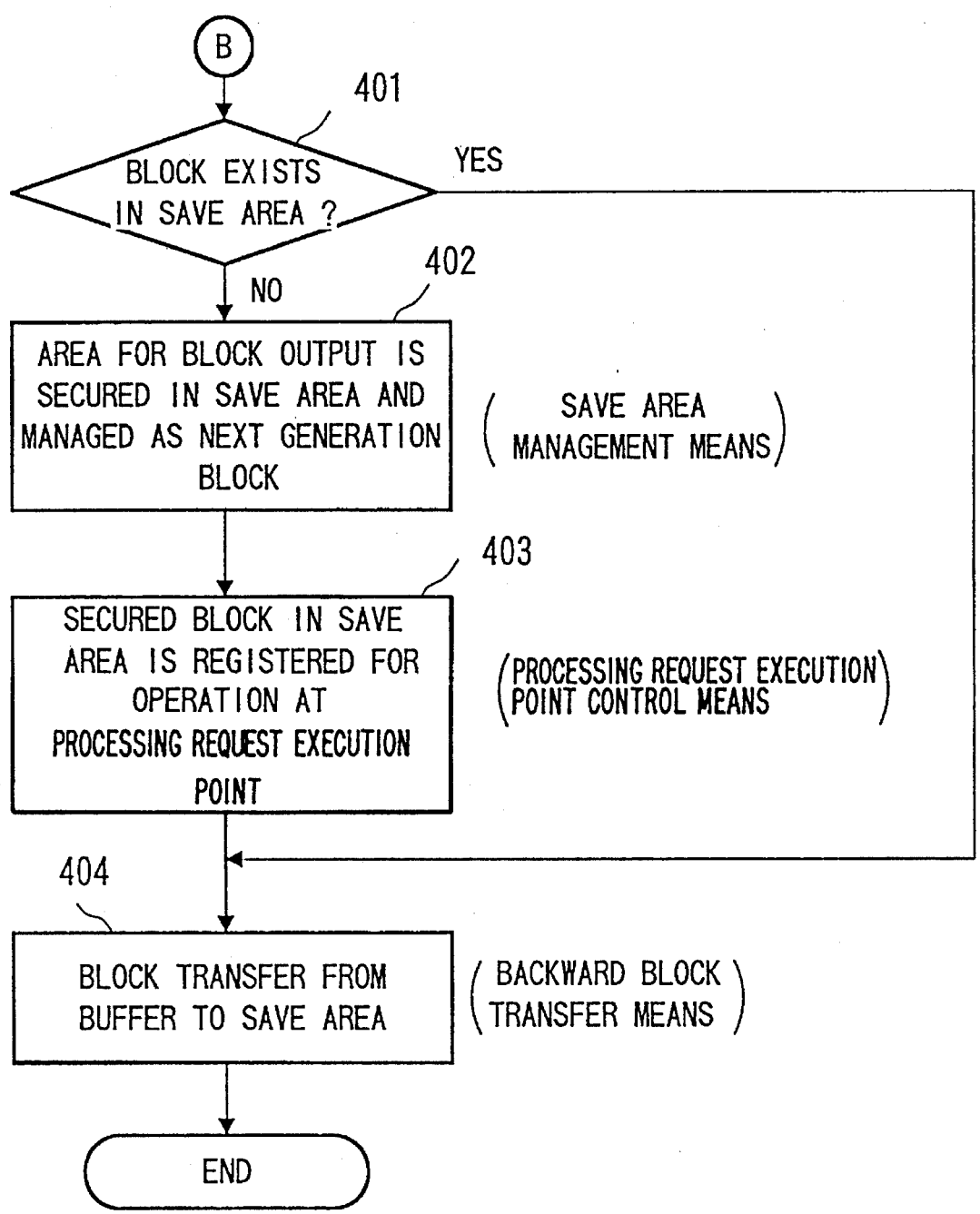
FIG. 4 is a flowchart to show continued input/output processing for blocks.

On the other hand, if the database processing program 19 or 20 has the input/output mode set to "output" in Step 201 of FIG. 2, the system follows the procedure given in FIG. 4. In FIG. 4, the save area management means 10 judges whether the requested block 2 exists in the save area 5 or not (Step 401). The blocks which are being referred to by other database processing programs are excluded here.

If the block 2 does not exist in the save area 5 in Step 401, the save area management means 10 secures an area for block output in the save area 5 and manages the secured area as the block 6 of the next generation (Step 402). Then, the processing request execution point control means 11 registers the secured block 6 on the save area 5 with its generation for operation when establishing a processing request execution point (Step 403).

If the block 2 exists in the save area 5 in Step 401 and after the block 6 is secured and the required data is registered, the backward block transfer means 9 transfers the applicable block from the buffer pool 14 or 15 to the save area 5 (Step 404) to terminate the procedure.

Figure 5:
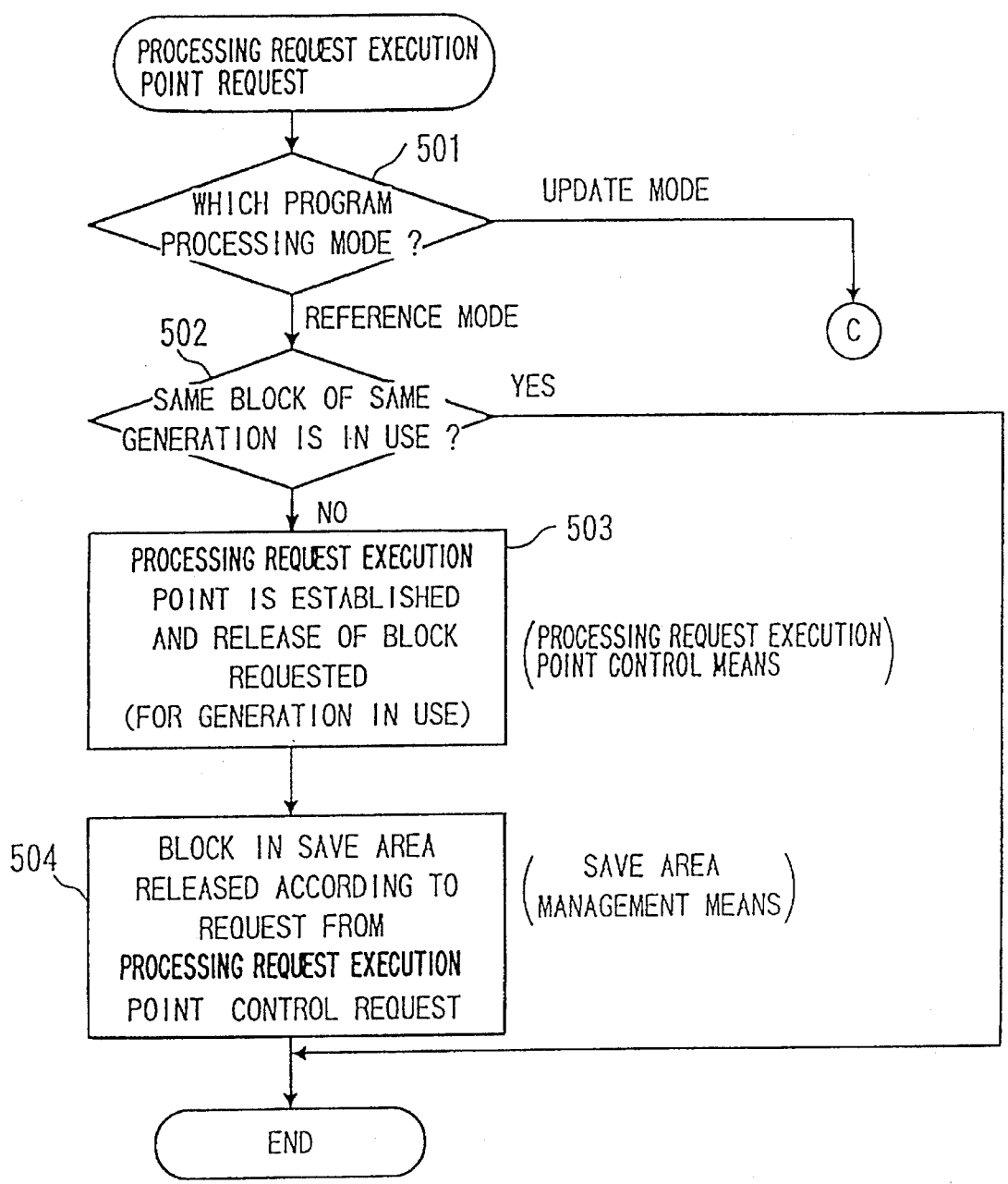
FIG. 5 is a flowchart to show the processing for processing request execution point establishment in a database system according to this embodiment.
Figure 6:
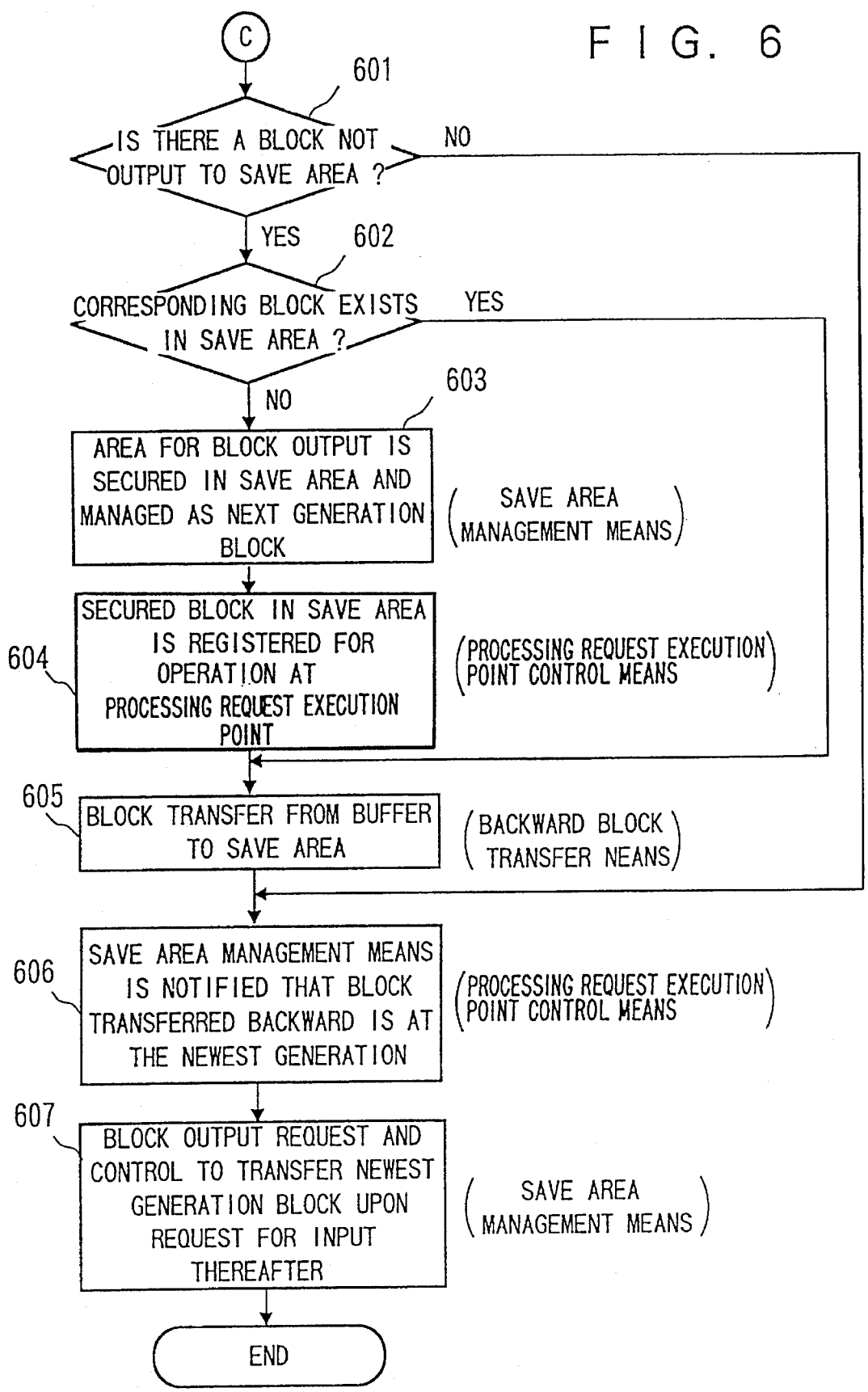
FIG. 6 is a flowchart to show continued processing for processing request execution point establishment.

The processing for processing request execution point establishment is now described referring to FIGS. 5 and 6. When the database processing program 19 or 20 requests establishment of a processing request execution point, the database processing device 18 judges the program processing mode of the database processing program 19 or 20 (Step 501). If the program processing mode is "reference", then the device refers to the processing request execution point control means 11 to judge whether the same block of the same generation is in use by another database processing program (Step 502). If any other database processing program is using the same block of the same generation, then the procedure terminates.

If there is no database processing program which uses the same block of the same generation in Step 502, then the processing request execution point control means 11 establishes a processing request execution point and at the same time requests the save area management means 10 to release the applicable block (Step 503). Then, the save area management means 10 releases the block according to the block release request from the processing request execution point control means 11 (Step 504).

On the other hand, if the program processing mode is "update" in Step 501, the system follows the procedure shown in FIG. 6. In FIG. 6, the save area management means 10 first refers to the processing request execution point control means 11 to check whether there is any block not output to the save area 5 (Step 601). If it is found that any block is not output to the save area 5 in Step 601, then it is judged whether the corresponding block exists in the save area 5 (Step 602).

If a corresponding block does not exist in the save area 5 in Step 602, the save area management means 10 secures an area for block output in the save area 5 and manages the area as a block of the next generation (Step 603). Then, the processing request execution point control means registers the secured block on the save area for operation when establishing a processing request execution point (Step 603).

If a block corresponding to the block not output to the save area 5 exists in the save area 5, and after an area is newly secured in Step 603 and required data is registered, the backward block transfer means 9 transfers the block from the buffer pool 14 or 15 to the save area 5 (Step 604).

If it is found that all blocks are output to the save area 5 in Step 601 and when the applicable block is transferred from the buffer pool 14 or 15 to the save area 5, the processing request execution point control means 11 notifies the save area management means 10 that the backward transferred block is the block of the newest generation (Step 605). Then the save area management means 10 requests the database input/output device 3 to output the applicable block and controls so that the block of the newest generation is transferred for input requests afterwards (Step 606) and terminates the procedure.

An example where the database system of the present invention is more advantageous than a conventional system is described below. The description is specifically given here supposing the situation as follows: with the database processing program 19 in reference mode and the database processing program 20 in update mode, the database processing program 19 sends input request to the block 2 in the database 1 for a reference, and before establishment of a processing request execution point, the database processing program 20 sends input and output requests to the same block 2 for update.

Firstly, the database processing program 19 in the reference mode requests input of the block 2 of the database 1. Since the program is in reference mode, the database block exclusive control device 13 accepts the processing request.

For the input/output mode is "input" and the program processing mode is "reference", the system goes through Steps 201 and 202 in FIG. 2 and proceeds to Step 203. If the applicable block 2 exists in the buffer pool 14, which is assigned to this program, the procedure terminates without any special processing, and the data is input from the buffer 16 (having the same contents as the block 2) on the buffer pool 14 via the database processing device 18 for reference.

If the applicable block 2 does not exist in the buffer pool 14 in Step 203, then the save area management means 10 judges whether the block 2 exists in the save area 5 in the extended storage 4 or not (Step 204). If the block 2 does not exist in the save area 5, the save area management means 10 requests the database input/output device 3 to input the block 2 from the database 1, and the save area management means 10 manages the block 6 input to the save area 5 by the database input/output device 3 as the first generation (Step 205).

If the block 2 exists in the save area 5 and after the block 2 is read from the database 1 to the save area 5, the program exclusive mode control means 12 registers "reference" as the program exclusive mode and the processing request execution point control means 11 registers the data required to keep the block with its generation until the applicable processing request execution point. Finally, the block transfer means 8 transfers the block from the save area 5 to the buffer pool 14 to terminate the procedure. The database processing program 19 refers to data input from the buffer 16 on the buffer pool 14 via the database processing device 18.

Meanwhile, if the database processing program 20 in update mode requests input of the block 2 in the database 1 for later update when the system is in the situation as described above, the database block exclusive control device 13 accepts the processing request even though the program is in update mode, because the database processing program 19 already using the block 2 is in the reference mode.

For the database processing program 20 has the input/output mode set to "input" and the program processing mode "update", the system goes through Steps 201 and 202 in FIG. 2 and proceeds to Step 301 in FIG. 1. If the applicable block 2 exists in the buffer pool 15, which is assigned to this program, the procedure terminates without any special processing. The database processing program 20 inputs data from the buffer 17 (having the same contents as the block 2) on the buffer pool 15 via the database processing device 18. If the applicable block 2 does not exist in the buffer pool 15, then the save area management means 10 judges whether the block 2 exists in the save area 5 in the extended storage 4 (Step 302).

In this case, since the database processing program 19 has already referred to the block 2, the block contents exist in the save area 5, and the system proceeds to Step 304. The program exclusive mode control means 12 registers "update" as the program exclusive mode. Finally, the block transfer means 8 transfers the block from the save area 5 to the buffer 17 on the buffer pool 15 to terminate the procedure. The database processing program 20 refers to the buffer 17 on the buffer pool 15 via the database processing device 18. Then, for update of the block 2 referred to by the database processing program 20, the block is updated on the buffer pool 15 and output is requested. Since the input/output mode is now "output", the system follows the procedure on the "output" side of Step 201 in FIG. 2 and proceeds to Step 401 in FIG. 4.

The save area management means 10 judges whether the requested block 2 after update exists in the save area 5 or not (Step 401). It does not exist there in this case, and the save area management means 10 secures an area for block output in the save area 5 and manages the secured area as the block 6 of the next generation. The processing request execution point control means 11 registers the secured block 6 on the save area 5 for operation when establishing a processing request execution point and the backward block transfer means 9 transfers the applicable block from the buffer pool 15 to the save area 5 (Steps 402, 403 and 404) and the procedure terminates.

If, after the processing as described above, but before establishment of a processing request execution point, the database processing program 19 inputs another block for reference resulting in overflow of block 2 contents at the buffer pool 14, input of the same block 2 by the database processing program 19 after that causes the system to go through Steps 201, 202 and 203 of FIG. 2 and proceed to Step 204. Since the block 2 is stored in the block 6 in the save area 5 as the first generation, any contradiction can be avoided by transferring the block of the applicable generation from the save area 5 to the buffer pool 14 after going through Steps 206 and 207.

Thus, even when the database processing program 19 is referring to a block 2 in the database 1, the database processing program 20 can update the same block 2 without being placed in the wait state, which considerably improves the processing efficiency.

On the contrary, reference may be requested during update processing. Suppose the database processing program 20 in update mode requests input and output of the block 2 in the database 1 for update and before establishing a processing request execution point, the database processing program 19 requests input of the same block 2 for reference. In this case, too, the reference processing which is requested later can be executed without causing a wait state.

As described above, this embodiment can provide a database system capable of input/output of blocks in excess of the capacity of the buffer pool 14 or 15 assigned to the database processing program 19 or 20, which can realize efficient processing. When a database processing program tries to refer to the same block as the one already under update processing by another database processing program or tries to update the same block as the one already under update processing by another database processing program, the system allows the reference and update without placing the database processing program which sends request later in the wait state and without causing any contradiction. This results in considerably improved processing efficiency of the database.

While the invention has been described in its preferred embodiments, it is to be understood that various modifications may be made therein. For example, there are two database processing programs and two buffer pools in the above embodiment, but it is possible to provide three or more database processing programs and buffer pools. It is intended to cover in the appended claims all such modifications as fall within the true spirit and scope of the invention.

What is claimed is:

1. A database system comprising:

a database having a storage area divided into a plurality of blocks, said blocks storing data;

buffer means for reading and storing said blocks in said database upon a processing request from a database processing program for reference to or update of said blocks by said database processing program;

exclusive control means for accepting or excluding said processing request depending on whether said database processing program is in a reference mode or an update mode;

extended storage means located between said database and said buffer means and independent of said buffer means for temporarily saving said blocks to be transferred from said database to said buffer means or from said buffer means to said database and to keep the same block for a plurality of generations;

save control means provided with management means for managing said blocks saved by said extended storage at different times as different generations; and means for transferring said blocks between said buffer means and said extended storage means according to said block generation.

2. The database system of claim 1 wherein said save control means is provided with program exclusive mode control means to register a reference or an update program exclusive mode for said block saved in said extended storage means for use in exclusive control by said exclusive control means.

3. The database system of claim 1 wherein said save control means is provided with a processing request execution point control means to keep said block saved in said extended storage means with its generation until establishment of a processing request execution point and, upon request for such processing request execution point establishment from said database processing program, refers to said processing request execution point control means and establishes a processing request execution point.

4. The database system of claim 1 wherein said save control means is provided with transfer means to transfer blocks from said extended storage means to said buffer means and backward transfer means to transfer blocks from said buffer means to said extended storage means.

5. The database system of claim 1 wherein said management means of said save control means manages blocks, treating the block saved from said database to said extended storage means as the first generation, the block secured in said extended storage means to save the block from said buffer means as the next generation, and the block transferred from said buffer means as the newest generation.

6. The database system of claim 1 wherein;

said exclusive control means unconditionally accepts any processing request from a database processing program in the reference mode, and performs exclusive control for a database processing program in the update mode by accepting a processing request if the requested block is not in use; and if the requested block is in use, accepts a processing request only when the database processing program is in a reference mode and places the database processing program in a wait state when the database processing program is in an update mode.

7. A database system comprising:

a database having a storage area divided into a plurality of blocks, said blocks each storing data;

buffer means for reading and storing a block in said database upon a processing request from a data base processing program for reference to or update of said block by said database processing program;

exclusive control means for unconditionally accepting any processing request from a data base processing program in a reference mode, and performing exclusive control for a database processing program in an update mode by accepting a processing request if the requested block is not in use, and if the requested block is in use, accepting a processing request only when the database processing program is in a reference mode and placing the program in a wait state if the database processing program is in an update mode;

extended storage means located between said database and said buffer means and independent of said buffer means for temporarily saving blocks to be stored from said database to said buffer means or from said buffer means to said database, and for storing the same block for a plurality of generations;

save control means provided with management means for managing blocks treating the block saved from said database to said extended storage means as the first generation, the block secured in said extended storage means to save the block from said buffer means as the next generation, and the block transferred from said buffer means to said next generation block as the newest generation;

transfer means to transfer blocks between said buffer means and said extended storage means according to said block generation;

program execution mode control means for registering a reference or an update program exclusive mode for said block saved in said extended storage means for use by said exclusive control means; and a processing request executing point control means for keeping said block saved in said extended storage means with its generation until the establishment of a processing request executing point.

\* \* \* \* \*